(12) United States Patent
Chen (10) Patent No.: US 11,765,667 B2
(45) Date of Patent: Sep. 19, 2023

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 71 days.

(21) Appl. No.: 17/482,360

(22) Filed: Sep. 22, 2021

(65) Prior Publication Data

US 2022/0015042 A1    Jan. 13, 2022

Related U.S. Application Data

(63) Continuation of application No. 16/613,278, filed as application No. PCT/CN2017/086305 on May 27, 2017, now Pat. No. 11,140,638.

(51) Int. Cl.
| | |
|---|---|
| *H04W 52/42* | (2009.01) |
| *H04W 52/32* | (2009.01) |
| *H04B 7/06* | (2006.01) |
| *H04L 5/10* | (2006.01) |
| *H04L 25/02* | (2006.01) |

(Continued)

(52) U.S. Cl.
CPC ........ *H04W 52/325* (2013.01); *H04B 7/0626* (2013.01); *H04L 5/10* (2013.01); *H04L 25/0226* (2013.01); *H04W 52/146* (2013.01); *H04W 52/242* (2013.01); *H04W 52/42* (2013.01)

(58) Field of Classification Search
CPC ..... H04W 72/04; H04W 16/28; H04W 52/08; H04W 52/10; H04W 52/58; H04W 52/42; H04W 74/08; H04B 17/318; H04B 7/0452

See application file for complete search history.

(56) References Cited

U.S. PATENT DOCUMENTS

| | | | |
|---|---|---|---|
| 2014/0162717 A1 | 6/2014 | Liu | |
| 2019/0349864 A1* | 11/2019 | Zhang | .................... H04B 7/088 |
| 2019/0349868 A1* | 11/2019 | Zhang | .................. H04L 5/0048 |

FOREIGN PATENT DOCUMENTS

KR    102346896    1/2022

OTHER PUBLICATIONS

KIPO, Office Action for KR Application No. 10-2022-7023814, dated Sep. 20, 2022.

(Continued)

*Primary Examiner* — Tu X Nguyen
(74) *Attorney, Agent, or Firm* — Hodgson Russ LLP (57) ABSTRACT

The embodiments of the present application provide a wireless communication method and device, capable of performing appropriate power control of a sounding reference signal (SRS). The method comprises: according to a first uplink signal, a first downlink signal, a first beam or a first beam pair corresponding to an SRS resource group, determining a target path loss value for an SRS resource of the SRS resource group; according to the target path loss value, determining a target transmission power for the SRS resource of the SRS resource group; and according to the target transmission power, transmitting an SRS to a network device on the SRS resource of the SRS resource group.

19 Claims, 2 Drawing Sheets

(51) Int. Cl.
*H04W 52/14* (2009.01)
*H04W 52/24* (2009.01)

(56) References Cited

OTHER PUBLICATIONS

INAPI, Office Action for CL Application No. 201903319, dated Aug. 18, 2022.
INAPI, Office Action for CL Application No. 201903319, dated Jan. 12, 2022.
ILPI, Office Action for IL Application No. 270621, dated Jan. 24, 2022.
IDIP, Office Action for ID Application No. P00201912289, dated Feb. 11, 2022.
KIPO, Office Action issued in KR Patent Application No. 10-2021-7038086, dated Dec. 8, 2021.
JPO, Office Action issued in JP Patent Application No. 2019-564036, dated Nov. 12, 2021.
Huawei, HiSilicon, "Codebook Based Transmission for UL MIMO", 3GPP TSG RAN WG1 Meeting #89, R1-1709206, May 15-19, 2017.
EPO, Communication Pursuant to Article 94(3) EPC issued in European Application No. 17912179.3, dated Oct. 15, 2021.
LTE Advanced Pro, 3rd Generation Partnership Project, Technical Specification Group Radio Access Network, Evolved Universal Terrestrial Radio Access (E-ULTRA), Multiplexing and Channel Coding (Release 14), 3GPP TS 36.212, V14.2.0, Mar. 2017.
LTE Advanced Pro, 3rd Generation Partnership Project, Technical Specification Group Radio Access Network, Evolved Universal Terrestrial Radio Access (E-ULTRA), Physical Layer Procedures (Release 14), 3GPP TS 36.213, V14.2.0, Mar. 2017.
LTE Advanced Pro, 3rd Generation Partnership Project, Technical Specification Group Radio Access Network, Evolved Universal Terrestrial Radio Access (E-ULTRA), Physical Layer, Measurements (Release 14), 3GPP TS 36.214, V14.2.0, Mar. 2017.
LTE Advanced Pro, 3rd Generation Partnership Project, Technical Specification Group Radio Access Network, Evolved Universal Terrestrial Radio Access (E-ULTRA), Radio Resource Control (RRC), Protocol Specification (Release 14), 3GPP TS 36.331, V14.2.0, Mar. 2017.
IP Australia, Examination Report No. 1 for AU 2017416807, dated Apr. 13, 2022.
EPO, Office Action for EP Application No. 17912179.3, dated Feb. 8, 2023.

\* cited by examiner

WIRELESS COMMUNICATION METHOD AND DEVICE

CROSS-REFERENCE TO RELATED APPLICATION

This application is a continuation of U.S. application Ser. No. 16/613,278, filed Nov. 13, 2019, which is a U.S. National Stage Entry of International Application No. PCT/CN2017/086305, filed May 27, 2017, the entire disclosures of which are incorporated herein by reference.

TECHNICAL FIELD

The present application relates to the field of communications and, more particularly, to a wireless communication method and device.

BACKGROUND

In the New Radio (NR) system, uplink beam management, including transmitting beam management and receiving beam management, may be performed based on a Sounding Reference Signal (SRS). For the transmitting beam management, the terminal device may send the SRS by using different beams on a plurality of SRS resources, and the network side selects at least one SRS resource based on strengths of the received signals on the plurality of SRS resources and indicate it to the terminal, so that the terminal uses a beam corresponding to this SRS resource for transmitting data. For the receiving beam management, the terminal transmits the SRS by using the same beam on one or more SRS resources, and the network side receives the SRS signals on the plurality of SRS resources based on different receiving beams, and selects a receiving beam for receiving data according to strengths of the received signals.

The selection of the transmission power of the SRS signal has an important influence on the selection of the receiving beam and the transmitting beam in beam management.

Therefore, how to control the power of the SRS signal is an urgent problem to be solved.

SUMMARY

The embodiments of the present application provide a wireless communication method and device, which can perform reasonable power control on the SRS.

In a first aspect, there is provided a wireless communication method, including:
  determining a target path loss value for a Sounding Reference Signal (SRS) resource in a SRS resource set according to a first uplink signal, a first downlink signal, a first beam, or a first beam pair link corresponding to the SRS resource set;
  determining a target transmission power for the SRS resource in the SRS resource set according to the target path loss value; and
  transmitting an SRS to a network device on the SRS resource in the SRS resource set according to the target transmission power.

In combination with the first aspect, in a possible implementation of the first aspect, the determining the target path loss value for the SRS resource in the SRS resource set includes:
  determining a same target path loss value for the SRS resources in the SRS resource set.

In combination with the first aspect or any of the above possible implementations, in another possible implementation of the first aspect, the determining the target path loss value for the Sounding Reference Signal (SRS) resource in the SRS resource set according to the first uplink signal, the first downlink signal, the first beam, or the first beam pair link corresponding to the SRS resource set includes:
  determining the target path loss value for the SRS resource in the SRS resource set according to the same first uplink signal, first downlink signal, first beam, or first beam pair link.

In combination with the first aspect or any of the above possible implementations, in another possible implementation of the first aspect, the determining the target transmission power for the SRS resource in the SRS resource set includes:
  determining a same target transmission power for the SRS resources in the SRS resource set.

In combination with the first aspect or any of the above possible implementations, in another possible implementation of the first aspect, before determining the target path loss value for the Sounding Reference Signal (SRS) resource in the SRS resource set according to the first uplink signal, the first downlink signal, the first beam, or the first beam pair link corresponding to the SRS resource set, the method further includes:
  receiving first indication information of the network device, wherein the first indication information is used to indicate the first uplink signal, the first downlink signal, the first beam, or the first beam pair link corresponding to the SRS resource set, or is used to indicate a resource for carrying the first uplink signal, a resource for carrying the first downlink signal, or a resource for receiving or transmitting a signal by using the first beam or the first beam pair link.

In combination with the first aspect or any of the above possible implementations, in another possible implementation of the first aspect, before determining the target path loss value for the Sounding Reference Signal (SRS) resource in the SRS resource set according to the first uplink signal, the first downlink signal, the first beam, or the first beam pair link corresponding to the SRS resource set, the method further includes:
  determining the first uplink signal, the first downlink signal, the first beam, or the first beam pair link corresponding to the SRS resource set according to a first preset relationship.

In combination with the first aspect or any of the above possible implementations, in another possible implementation of the first aspect, the first uplink signal is an SRS, a Physical Uplink Shared Channel (PUSCH), a Physical Uplink Control Channel (PUCCH), a Physical Random Access Channel (PRACH), a Demodulation Reference Signal (DMRS) or a Phase Tracking Reference Signal (PTRS).

In combination with the first aspect or any of the above possible implementations, in another possible implementation of the first aspect, the first uplink signal is an SRS transmitted on one SRS resource in the SRS resource set; or the first uplink signal is an SRS transmitted on an SRS resource indicated by most recently received SRS resource indication information.

In combination with the first aspect or any of the above possible implementations, in another possible implementation of the first aspect, the determining the target path loss value for the Sounding Reference Signal (SRS) resource in the SRS resource set according to the first uplink signal, the first downlink signal, the first beam, or the first beam pair link corresponding to the SRS resource set includes:

determining a path loss value used for calculating a transmission power of the first uplink signal as the target path loss value.

In combination with the first aspect or any of the above possible implementations, in another possible implementation of the first aspect, the determining the target path loss value for the Sounding Reference Signal (SRS) resource in the SRS resource set according to the first uplink signal, the first downlink signal, the first beam, or the first beam pair link corresponding to the SRS resource set includes:

determining the target path loss value by performing a downlink path loss estimation based on the first uplink signal, the first beam, or a second downlink signal associated with the first beam pair link.

In combination with the first aspect or any of the above possible implementations, in another possible implementation of the first aspect, before the determining the target path loss value by performing the downlink path loss estimation based on the second downlink signal associated with the first uplink signal, the first beam, or the first beam pair link, the method further includes:

receiving second indication information transmitted by the network device, wherein the second indication information is used to indicate an association relationship between the second downlink signal and one of following: the first uplink signal, the first beam, or the first beam pair link.

In combination with the first aspect or any of the above possible implementations, in another possible implementation of the first aspect, before the determining the target path loss value by performing the downlink path loss estimation based on the second downlink signal associated with the first uplink signal, the first beam, or the first beam pair link, the method further includes:

determining a downlink signal associated with the first uplink signal, the first beam, or the first beam pair link as the second downlink signal according to a second preset relationship.

In combination with the first aspect or any of the above possible implementations, in another possible implementation of the first aspect, the determining the target path loss value by performing the downlink path loss estimation based on the second downlink signal associated with the first uplink signal, the first beam, or the first beam pair link includes:

obtaining a first path loss value according to a receiving power and a transmission power of the second downlink signal; and determining the first path loss value as the target path loss value.

In combination with the first aspect or any of the above possible implementations, in another possible implementation of the first aspect, the first downlink signal is a CSI-RS, a synchronization signal, a synchronization signal block, a time-frequency Tracking Reference Signal (TRS), a Phase Tracking Reference Signal (PTRS), a Physical Downlink Shared Channel (PDSCH), a Physical Downlink Control Channel (PDCCH) or a DMRS.

In combination with the first aspect or any of the above possible implementations, in another possible implementation of the first aspect, the determining the target path loss value for the Sounding Reference Signal (SRS) resource in the SRS resource set according to the first uplink signal, the first downlink signal, the first beam, or the first beam pair link corresponding to the SRS resource set includes:

obtaining a second path loss value according to a receiving power and a transmission power of the first downlink signal; and determining the second path loss value as the target path loss value.

In combination with the first aspect or any of the above possible implementations, in another possible implementation of the first aspect, the target path loss value is a downlink path loss value, and the determining the target transmission power for the SRS resource in the SRS resource set according to the target path loss value includes:

obtaining an uplink path loss value according to the downlink path loss value; and determining the target transmission power according to the uplink path loss value.

In combination with the first aspect or any of the above possible implementations, in another possible implementation of the first aspect, the SRS resource set includes a plurality of SRS resources, and the transmitting the SRS to the network device on the SRS resources in the SRS resource set respectively according to the target transmission power includes:

transmitting the SRS to the network device using different transmission beams on different SRS resources in the SRS resource set respectively according to the target transmission power.

In combination with the first aspect or any of the above possible implementations, in another possible implementation of the first aspect, the SRS resource set is an SRS resource set for uplink beam management.

In combination with the first aspect or any of the above possible implementations, in another possible implementation of the first aspect, the SRS resource set is used to carry a set of non-periodic SRS transmissions triggered by a non-periodic SRS trigger signaling; or the SRS resource set is used to carry a set of persistent SRS transmissions activated by a persistent SRS activation signaling.

According to a second aspect, there is provided a terminal device for performing the method in the above first aspect or any of the possible implementations of the first aspect. In particular, the terminal device includes functional modules for performing the method in the above first aspect or any of the possible implementations of the first aspect.

According to a third aspect, there is provided a terminal device, including a processor, a memory and a transceiver, the processor, the memory and the transceiver are communicated with each other through internal connection paths to transmit control and/or data signals, so that the network device performs the method in the above first aspect or any of the possible implementations of the first aspect.

In a fourth aspect, there is provided a computer readable medium for storing computer programs, which include instructions for executing the above first aspect or any possible implementation of the first aspect.

In a fifth aspect, there is provided a computer program product including instructions, the computer program product, when being running on a computer, enables the computer to execute the method in the above first aspect or any possible implementation of the first aspect.

Therefore, in the embodiments of the present application, the terminal device determines the target path loss value for the SRS resource in the SRS resource set according to the first uplink signal, the first downlink signal, the first beam, or the first beam pair link corresponding to the SRS resource set; and determines the target transmission power for the SRS resource in the SRS resource set according to the target path loss value, so that a reasonable transmission power can be selected for the SRS transmission.

BRIEF DESCRIPTION OF THE DRAWINGS

In order to illustrate the technical solutions of the embodiments of the present application more clearly, the drawings used in the description of the embodiments or the related art will be briefly described below. Obviously, the drawings in the following description merely involve some embodiments of the present application. For those of ordinary skills in the art, other drawings may also be obtained based on these drawings without going through any creative effort.

DETAILED DESCRIPTION

The following clearly and completely describes the technical solutions in the embodiments of the present application with reference to the accompanying drawings in the embodiments of the present application. Apparently, the described embodiments are merely some but not all of the embodiments of the present application. Based on the embodiments of the present application, all other embodiments obtained by those of ordinary skills in the art without going through any creative effort shall fall within the scope of protection of the present application.

The technical solutions of the embodiments of the present application may be applied to various communication systems, for example, a Global System of Mobile communication ("GSM") system, a Code Division Multiple Access (CDMA) system, a Wideband Code Division Multiple Access (WCDMA) system, General Packet Radio Service ("GPRS"), a Long Term Evolution ("LTE") system, a LTE Frequency Division Duplex ("FDD") system, LTE Time Division Duplex ("TDD"), a Universal Mobile Telecommunication System ("UMTS"), a Worldwide Interoperability for Microwave Access ("WiMAX") communication system, or a future 5G system (also known as a New Radio (NR) system), and the like.

Figure 1:
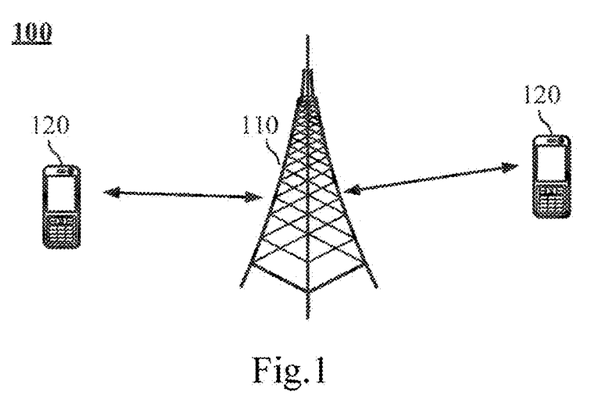
FIG. 1 is a schematic diagram of a wireless communication system according to an embodiment of the present application.

FIG. 1 shows a wireless communication system 100 to which an embodiment of the present application is applied. The wireless communication system 100 may include a network device 110. The network device 110 may be a device that communicates with a terminal device. The network device 110 may provide communication coverage for a particular geographic area and may communicate with the terminal device (e.g., UE) located within the coverage area. The network device 110 may be a base station (Base Transceiver Station, BTS) in the GSM system or the CDMA system, or may be a base station (NodeB, NB) in the WCDMA system, or may be an evolved base station (Evolutional Node B, eNB or eNodeB) in the LTE system, or a wireless controller in a Cloud Radio Access Network (CRAN), or the network device may be a relay station, an access point, an in-vehicle device, a wearable device, a network side device in a future 5G network or a network device in a Public Land Mobile Network (PLMN) in the future.

The wireless communication system 100 also includes at least one terminal device 120 located within the coverage of the network device 110. The terminal device 120 may be mobile or fixed. The terminal device 120 may refer to an access terminal, a User Equipment (UE), a subscriber unit, a subscriber station, a mobile station, a mobile stage, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to a wireless modem, an in-vehicle device, a wearable device, a terminal device in future 5G network, or a terminal device in future evolved PLMN, and the like.

Device to Device (D2D) communication may be performed between the terminal devices 120.

Alternatively, the 5G system or network may also be referred to as a New Radio (NR) system or network.

FIG. 1 exemplarily shows one network device and two terminal devices. Alternatively, the wireless communication system 100 may include a plurality of network devices and may include other numbers of terminal devices within the coverage of each network device, which is not limited by the embodiments of the present application.

The wireless communication system 100 may further include other network entities, such as a network controller, a mobility management entity, and the like, which is not limited by the embodiments of the present application.

It should be understood that the terms "system" and "network" are used interchangeably herein. The term "and/or" in the present disclosure is merely an association describing the associated objects, indicating that there may be three relationships, for example, A and/or B may indicate three situations: A exists separately, both A and B exist at the same time, and B exists separately. In addition, the character "/" in the present disclosure generally indicates that the contextual objects has an "or" relationship.

Figure 2:
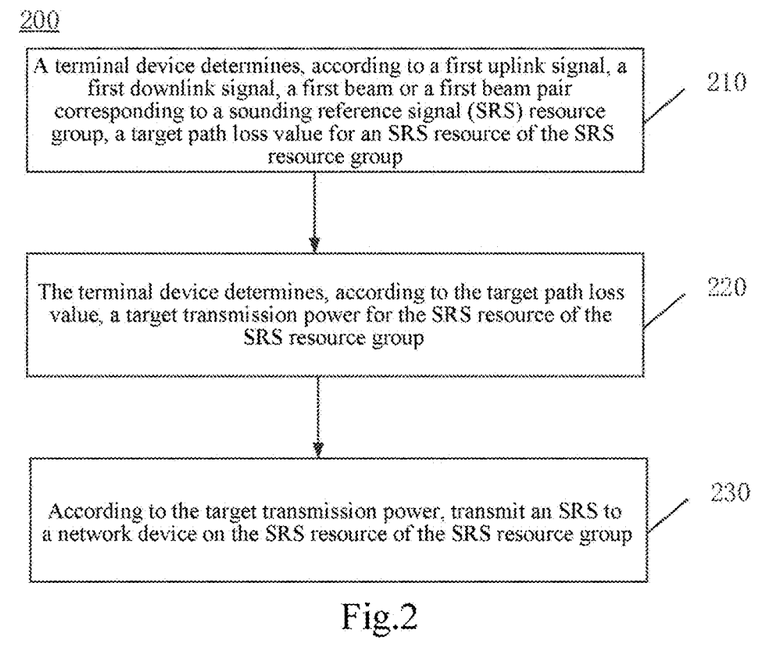
FIG. 2 is a schematic flowchart of a wireless communication method according to an embodiment of the present application.

FIG. 2 is a schematic flowchart of a wireless communication method 200 according to an embodiment of the present application. The method 200 is applicable to the system shown in FIG. 1, but is not limited thereto. The method 200 may be performed by the terminal device.

As shown in FIG. 2, the method 200 includes at least some of the following.

In 210, the terminal device determines a target path loss value for a SRS resource in a SRS resource set according to a first uplink signal, a first downlink signal, a first beam, or a first beam pair link corresponding to the SRS resource set.

The SRS resource set may include one or more SRS resources.

The network device may configure the SRS resource(s) in the SRS resource set, or the configuration of the SRS resource(s) in the SRS resource set may be preset, for example, may be preset by the factory.

The configuration of each SRS resource in the SRS resource set may include a configuration of at least one of the following: a period of transmitting the SRS on the SRS resource, an occupied time domain resource, an occupied frequency domain resource, and an occupied spatial resource, a code domain resource used, and/or a number of times of transmitting the SRS after receiving a trigger signaling.

The configuration of each SRS resource in the SRS resource set is different from that of the other SRS resource (s) in the SRS resource set. For example, the transmitting periods of the SRS are different, the occupied time domain resources are different, the occupied frequency domain resources are different, the occupied spatial domain resources are different, the code domain resources used are different, and/or the numbers of times of transmitting the SRS after receiving the trigger signaling are different.

The SRS resource set is an SRS resource set for uplink beam management.

The uplink beam management based on SRS may include a transmitting beam management and a receiving beam management.

For the transmitting beam management, the terminal device may transmit the SRS by using different beams on the multiple SRS resources, and the network device selects at least one SRS resource based on strengths of the received signals on the multiple SRS resources and indicates it to the terminal device, so that the terminal device may use a beam corresponding to this SRS resource to transmit data to the network device.

For the receiving beam management, the terminal device may transmit the SRS by using the same beam on one or more SRS resources, and the network device receives the SRS signals on the multiple SRS resources based on different receiving beams, and selects the receiving beam for receiving the data according to strengths of the received signals.

The SRS resource set is configured to carry a set of non-periodic SRS transmissions triggered by a non-periodic SRS trigger signaling.

The network device may trigger the non-periodic SRS trigger signaling as needed. After receiving the non-periodic trigger signaling, the terminal device may use the SRS resource set to transmit a set of non-periodic SRS transmissions. The non-periodic SRS trigger signaling may be carried by the DCI.

The SRS resource set is used to carry a set of persistent SRS transmissions activated by one persistent SRS activation signaling.

The network device may activate the persistent SRS transmission by using the SRS activation signaling, and after receiving the SRS activation signaling, the terminal device may use the SRS resource set to transmit a set of persistent SRS transmissions, where the persistence SRS transmission may be a periodic SRS transmission.

The terminal device may determine the same target path loss value for the SRS resource(s) in the SRS resource set.

It should be understood that if the path loss values used by individual SRS resources are the same, only one path loss value may be determined for one SRS resource set, and it is not necessary to determine one path loss value for each resource.

For the transmitting beam management or the receiving beam management, the terminal device may send the SRS signal on different SRS resources by using the same transmission power. In this case, the network device may select a more appropriate transmitting/receiving beam according to strengths of the received signals. If the same path loss value is determined for the SRS resources in the SRS resource set, the same or similar transmission power may be determined, so that the terminal device may transmit the SRS resources with the same or similar transmission power.

The target path loss value is determined for the SRS resource in the SRS resource set according to the same first uplink signal, first downlink signal, first beam, or first beam pair link.

In order to determine the same or similar target path loss value, the terminal device may determine the target path loss value for the SRS resource in the SRS resource set according to the same first uplink signal, first downlink signal, first beam, or first beam pair link.

Before the terminal device determines the target path loss value for the SRS resource in the SRS resource set according to the first uplink signal, the first downlink signal, the first beam, or the first beam pair link corresponding to the SRS resource set, the terminal device may select the first uplink signal, the first downlink signal, the first beam, or the first beam pair link for determining the target path loss value.

In an implementation manner, the terminal device receives first indication information that is sent by the network device, where the first indication information is used to indicate the first uplink signal, the first downlink signal, the first beam, or the first beam pair link corresponding to the SRS resource set, or is used to indicate a resource for carrying the first uplink signal, a resource for carrying the first downlink signal, or a resource for receiving or transmitting the signal by using the first beam or the first beam pair link.

The network device may indicate to the terminal device, according to actual conditions, the first uplink signal, the first downlink signal, the first beam, or the first beam pair link used for determining the target path loss, or indicate the resource that carries the first uplink signal, the resource that carries the first downlink signal or the resource that receives or transmits a signal by using the first beam or the first beam pair link.

For example, if the network device needs the terminal device to transmit the SRS by using a relatively high transmission power, the uplink signal, the downlink signal, the beam, or the first beam pair link, which may obtain a relatively high path loss value by calculation, the resource carrying the uplink signal or the downlink signal, or the resource that receives or transmits the signal by using the beam or the beam pair link are indicated to the terminal device.

When the first indication information indicates a resource that carries the first uplink signal, a resource that carries the first downlink signal, or a resource that receives or transmits the signal by using the first beam or the first beam pair link, the terminal device may determine the first uplink signal, the downlink signal, the first beam, or the first beam pair link according to the resource indicated by the first indication information.

The first indication information may be configured to the terminal device together with the configuration information of the SRS resource set by using Radio Resource Control (RRC) signaling, or the first indication information may be indicated to the terminal device together with trigger signaling or activation signaling of the SRS resource set by Downlink Control Information (DCI) or Media Access Control (MAC) Control Element (CE).

The first indication information is used to indicate an SRS resource of the SRS resource set, so that the terminal device may determine the first uplink signal (that is, the SRS sent by the SRS resource) based on the SRS resource.

Alternatively, the first indication information is used to indicate an uplink signal or a downlink signal or a beam or a beam pair (Beam Pair Link, BPL) corresponding to the SRS resource set.

For example, the first indication information indicates: an uplink signal carried by a certain SRS resource in the SRS resource set, or a downlink signal carried by a CSI-RS resource corresponding to a certain SRS resource in the SRS resource set, or a beam used for sending a signal on a certain SRS resource in the SRS resource set, or a beam pair link composed of a receiving beam and a transmitting beam of a CSI-RS on a CSI-RS resource corresponding to a certain SRS resource in the SRS resource set.

In another implementation manner, the first uplink signal, the first downlink signal, the first beam, or the first beam pair link corresponding to the SRS resource set is determined according to a first preset relationship. The first preset relationship is preconfigured before leaving factory.

The first preset relationship may indicate which uplink signal(s), downlink signal(s), beam(s) or beam pair link(s) is the first uplink signal, the first downlink signal, the first beam, or the first beam pair link used for determining the target path loss value for the SRS resource set, and based on the relationship, the first uplink signal, the first downlink signal, the first beam, or the first beam pair link may be selected for the SRS resource set.

For example, the first preset relationship indicates that the first uplink signal for determining the target path loss value for the SRS resource set is the recently transmitted PUSCH or PUCCH signal, then the terminal device may use the recently transmitted PUSCH or PUCCH signal as the first uplink signal.

For example, the first preset relationship indicates that the first downlink signal for determining the target path loss value for the SRS resource set may be the downlink signal that is used by the terminal device recently to determine the uplink transmitting beam, then the terminal device may use the downlink signal that is recently used to determine the uplink transmitting beam as the first downlink signal.

For example, the first preset relationship indicates that the beam for determining the target path loss value for the SRS resource set may be a beam that is recently used by the terminal to transmit the PUSCH or the PUCCH, or a beam that is recently used by the terminal to receive the downlink signal, then the terminal device may use the beam for transmitting the PUSCH or the PUCCH recently, or the beam recently used by the terminal for receiving the downlink signal as the first beam.

For example, the first preset relationship indicates that the beam pair link for determining the target path loss value for the SRS resource set may be a downlink beam pair link of the terminal that is currently activated (e.g., a beam pair link composed of a beam that transmits the CSI-RS and a beam that receives the CSI-RS), then the currently activated beam pair link may be used as the first beam pair link, and when the currently activated beam pair link includes a plurality of beam pair links, one beam pair link may be selected therefrom as the first beam pair link.

The first uplink signal is SRS, PUSCH, PUCCH, PRACH, DMRS or PTRS.

The first uplink signal is an SRS transmitted by one SRS resource in the SRS resource set.

For example, the network device may indicate an index of this SRS resource in the SRS resource set, and other SRS resource(s) in the SRS resource set adopts the same path loss estimation as this SRS resource.

The first uplink signal is an SRS transmitted on the SRS resource indicated by the recently received SRS Resource Information (SRI).

Before receiving the SRI, the terminal device may transmit an SRS signal on one SRS resource collection (which may be the resource set mentioned in the embodiments of the present application) including the SRS resource indicated by the SRI, and each SRS resource may be transmitted using one beam. The SRI is generally indicated to the terminal device by DCI for scheduling uplink data transmission or scheduling uplink control information transmission. For example, the SRI may be indicated to the terminal by triggering the DCI of the aperiodic SRS.

The first downlink signal is a CSI-RS, a synchronization signal, a synchronization signal block, a TRS, a PTRS, a PDSCH, a PDCCH, or a DMRS.

For example, the network device may pre-configure multiple CSI-RS resources through high-layer signaling, and then indicate an index of one of the CSI-RS resources for downlink path loss estimation.

For example, the network device may transmit a plurality of synchronization signal blocks and indicate a time index of the synchronization signal block for the downlink path loss estimation, so that the terminal device may perform the downlink path loss estimation based on the synchronization signal in the synchronization signal block corresponding to the index or the DMRS of the PBCH in the synchronization signal block.

The first beam may be a transmitting beam of an uplink signal or a receiving beam of a downlink signal.

The first beam pair link is a pair of beams consisting of a transmitting beam and a receiving beam of one signal.

For ease of understanding, how to perform the calculation of the target path loss value will be described below in connection with several embodiments.

In one implementation manner, a path loss value used for calculating the transmission power of the first uplink signal is determined as the target path loss value.

For example, when the first uplink signal is the most recently transmitted PUCCH, the path loss value used for calculating the transmission power of the PUCCH may be determined as the target path loss value.

For example, when the first uplink signal is the SRS transmitted by one SRS resource in the SRS resource set, the path loss value may be calculated for the one SRS resource, and the calculated path loss value is used as the path loss value corresponding to all the SRS resources in the SRS resource set.

For example, when the first uplink signal is the SRS transmitted on the SRS resource indicated by the recently received SRI, and when the terminal device receives the SRI, the path loss value used for sending the SRS on the SRS resource indicated by the SRI may be determined, and the path loss value is used as the path loss value corresponding to all SRS resources in the SRS resource set. When the terminal device receives the SRI, the path loss value may be recalculated for the SRS resource indicated by the SRI, and the calculated path loss value is used as the path loss value corresponding to all the SRS resources in the SRS resource set.

The calculation of a corresponding path loss value for the SRS resource may be: receiving a CSI-RS on the CSI-RS resource corresponding to the SRS resource, and calculating a path loss value based on the transmission power and the receiving power of the CSI-RS.

The CSI-RS resource may be in one-to-one correspondence with the SRS resource, or one CSI-RS resource may correspond to multiple SRS resources.

In an implementation manner, the path loss estimation is performed on the first downlink signal to obtain a target path loss value.

The path loss value is estimated based on the receiving power and the transmission power of the first downlink signal, and the estimated path loss value is determined as the target path loss value.

For example, if the receiving power is P1 and the transmission power is P2, then the path loss value is expressed as PL=P1/P2. The path loss estimation value is usually expressed in dB, i.e., PL (dB)=10*lg (P1/P2) (dB).

The transmission power of the first downlink signal may be notified by the network device to the terminal device by using downlink signaling in advance, for example, when the first downlink signal is a CSI-RS, the transmission power may be included in the configuration information of the CSI-RS resource for sending the CSI-RS, so as to be notified to the terminal device.

In another implementation manner, the downlink path loss estimation is performed based on the second downlink signal associated with the first uplink signal, the first beam, or the first beam pair link, to obtain the target path loss value.

For example, the terminal device may perform downlink path loss estimation based on the second downlink signal associated with the first uplink signal. The terminal device obtains the transmitting beam of the first uplink signal based on the receiving beam of a certain downlink signal, and then the downlink signal may be used as the second downlink signal associated with the uplink signal. The receiving beam of the second downlink signal and the transmitting beam of the first uplink signal may be the same beam.

For example, the terminal device may perform downlink path loss estimation based on the first downlink signal associated with the first beam. The network device may configure a corresponding downlink signal for each beam to obtain a path loss value corresponding to the beam, and the second downlink signal associated with the first beam is the downlink signal configured to obtain the path loss value of the first beam. Alternatively, the second downlink signal is a downlink signal that uses the first beam as the transmitting beam or the receiving beam.

For example, the terminal device may perform downlink path loss estimation based on the second downlink signal associated with the first beam pair link. The network device may configure a corresponding downlink signal for each beam pair link to obtain a path loss value corresponding to the beam pair link. Alternatively, the second downlink signal is a downlink signal that uses the first beam pair link as the transmitting beam and the receiving beam.

The terminal device may obtain the first path loss value according to the receiving power and the transmission power of the second downlink signal; and determine the first path loss value as the target path loss value.

For example, if the receiving power is P1 and the transmission power is P2, the path loss value is expressed as PL=P1/P2. The path loss estimation value is usually expressed in dB, i.e., PL(dB)=10*lg (P1/P2) (dB).

The transmission power of the second downlink signal may be notified to the terminal device by the network device in advance by using downlink signaling. For example, when the second downlink signal is a CSI-RS, the transmission power may be included in the configuration information of the CSI-RS for sending the CSI-RS, so as to be notified to the terminal device.

The terminal device may receive second indication information that is sent by the network device, where the second indication information is used to indicate an association relationship between the second downlink signal and one of following: the first uplink signal, the first beam, or the first beam pair link, so that the terminal device may determine, according to the second indication information, the second downlink signal associated with the first uplink signal, the first beam, or the first beam pair link.

According to a second preset relationship, the terminal device may determine the downlink signal associated with the first uplink signal, the first beam, or the first beam pair link as the second downlink signal. The preset relationship is used to preset which downlink signal(s) is associated with the first uplink signal, the first beam, or the first beam pair link. The second preset relationship may be preconfigured before leaving factory.

The second downlink signal is a CSI-RS, a synchronization signal, a synchronization signal block, a TRS, a PTRS, a PDSCH, a PDCCH, or a DMRS.

In 220, the terminal device determines a target transmission power for the SRS resource in the SRS resource set according to the target path loss value.

The terminal device determines the same transmission power for the SRS resources in the SRS resource set.

It should be understood that if the transmission power used by each SRS resource is the same, only one transmission power may be determined for one SRS resource set, and it is not necessary to determine one transmission power for each resource.

Alternatively, the transmission power may be calculated according to a formula Pt=min {Pmax, a*PL+b} (dB).

Pt is the transmission power, Pmax is the maximum transmission power allowed by the uplink, PL is the path loss estimation value (using dB as a unit), and a is a path loss compensation factor, which is usually indicated by the network side to the terminal, and b represents other power control parameter.

The target path loss value is an uplink path loss value, and the terminal device may directly use the downlink path loss estimation as the uplink path loss value, or obtain the uplink path loss value by using some operations based on the downlink path loss estimation.

The target path loss value is a downlink path loss value, and an uplink path loss value is estimated according to the downlink path loss value; and the target transmission power is determined according to the uplink path loss value.

The network device may pre-configure a path loss offset value, and the terminal obtains an uplink path loss estimation value according to the downlink path loss estimation value and the path loss offset value, thereby calculating the transmission power.

For example, PL_UL=PL_DL+k, where PL_UL is the uplink path loss estimation value, PL_DL is the uplink path loss estimation value, and k is a network-side configured path loss offset value.

In 230, the SRS is transmitted to the network device on the SRS resource in the SRS resource set according to the target transmission power.

The terminal device may send the SRS to the network device on different SRS resources in the SRS resource set by using different transmitting beams respectively according to the target transmission power, so that the network device may use the same receiving beam to receive the SRS on the SRS resources in the SRS resource set respectively, and selects at least one SRS resource based on strengths of the received signals on the multiple SRS resources and indicates it to the terminal device, so that the terminal device may use the beam corresponding to this SRS resource to transmit data.

The terminal device may send the SRS to the network device on different SRS resources in the SRS resource set by using different transmitting beams respectively according to the target transmission power, so that the network device receives the SRS signal on multiple SRS resources based on different receiving beams, and selects a receiving beam for receiving data according to the strengths of the received signals.

Therefore, in the embodiments of the present application, the terminal device determines the target path loss value for the SRS resource(s) in the SRS resource set according to the first uplink signal, the first downlink signal, the first beam, or the first beam pair link corresponding to the SRS resource set; and determines the target transmission power for the SRS resource(s) in the SRS resource set according to the target path loss value, so that a reasonable transmission power may be selected for the SRS transmission.

Figure 3:
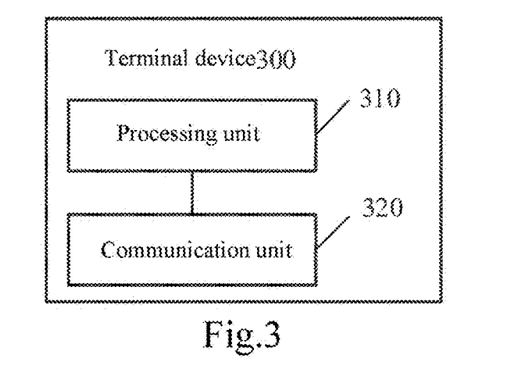
FIG. 3 is a schematic block diagram of a terminal device according to an embodiment of the present application.

FIG. 3 is a schematic block diagram of a terminal device 300 according to an embodiment of the present application. As shown in FIG. 3, the terminal device 300 includes a processing unit 310 and a communication unit 320.

The processing unit 310 is configured to determine a target path loss value for the SRS resource in the SRS resource set according to the first uplink signal, the first downlink signal, the first beam, or the first beam pair link corresponding to the sounding reference signal (SRS) resource set; and determine, according to the target path loss value, a target transmission power for the SRS resource in the SRS resource set.

The communication unit 320 is configured to send, according to the target transmission power, an SRS to the network device on the SRS resource in the SRS resource set.

The processing unit 310 is further configured to:
determine the same target path loss value for the SRS resources in the SRS resource set.

The processing unit 310 is further configured to:
determine, according to the same first uplink signal, first downlink signal, first beam, or first beam pair link, the target path loss value for the SRS resource in the SRS resource set.

The processing unit 310 is further configured to:
determine the same target transmission power for the SRS resources in the SRS resource set.

The communication unit 320 is further configured to:
receive first indication information of the network device, where the first indication information is used to indicate the first uplink signal, the first downlink signal, the first beam, or the a first beam pair link corresponding to the SRS resource set, or is used to indicate a resource carrying the first uplink signal, a resource carrying the first downlink signal, or a resource for receiving or transmitting a signal by using the first beam or the first beam pair link.

The processing unit 310 is further configured to:
determine, according to a first preset relationship, the first uplink signal, the first downlink signal, the first beam, or the first beam pair link corresponding to the SRS resource set.

The first uplink signal is an SRS, a physical uplink shared channel (PUSCH), a physical uplink control channel (PUCCH), a physical random access channel (PRACH), a demodulation reference signal (DMRS), or a phase tracking reference signal (PTRS).

The uplink signal is an SRS transmitted by one SRS resource in the SRS resource set; or
the uplink signal is an SRS transmitted on an SRS resource indicated by the most recently received SRS resource indication information.

The processing unit 310 is further configured to:
determine the path loss value used for calculating a transmission power of the first uplink signal as the target path loss value.

The processing unit 310 is further configured to:
determine the target path loss value by performing downlink path loss estimation based on the first uplink signal, the first beam, or a second downlink signal associated with the first beam pair link.

The communication unit 320 is further configured to:
receive second indication information sent by the network device, where the second indication information is used to indicate an association relationship between the second downlink signal and one of following: the first uplink signal, the first beam, or the first beam pair link.

The processing unit 310 is further configured to:
determine, according to a second preset relationship, a downlink signal associated with the first uplink signal, the first beam, or the first beam pair link as the second downlink signal.

The processing unit 310 is further configured to:
obtain a first path loss value according to the receiving power and the transmission power of the second downlink signal; and
determine the first path loss value as the target path loss value.

The first downlink signal is a CSI-RS, a synchronization signal, a synchronization signal block, a time-frequency synchronization reference signal (TRS), a phase tracking reference signal (PTRS), a PDSCH, a PDCCH, or a DMRS.

The processing unit 310 is further configured to:
obtain a second path loss value according to the receiving power and the transmission power of the first downlink signal; and
determine the second path loss value as the target path loss value.

The processing unit 310 is further configured to:
obtain an uplink path loss value according to the downlink path loss value; and
determine the target transmission power according to the uplink path loss value.

The communication unit 320 is further configured to:
send the SRS to the network device on different SDS resources in the SRS resource set by using different transmitting beams respectively according to the target transmission power.

The SRS resource set is an SRS resource set used for uplink beam management.

The SRS resource set is configured to carry a set of non-periodic SRS transmissions triggered by a non-periodic SRS trigger signaling; or the SRS resource set is used to carry a set of persistent SRS transmissions activated by one persistent SRS activation signaling.

It should be understood that the terminal device 300 may perform corresponding operations performed by the terminal device in the method shown in FIG. 2, and details are not described herein for brevity.

Figure 4:
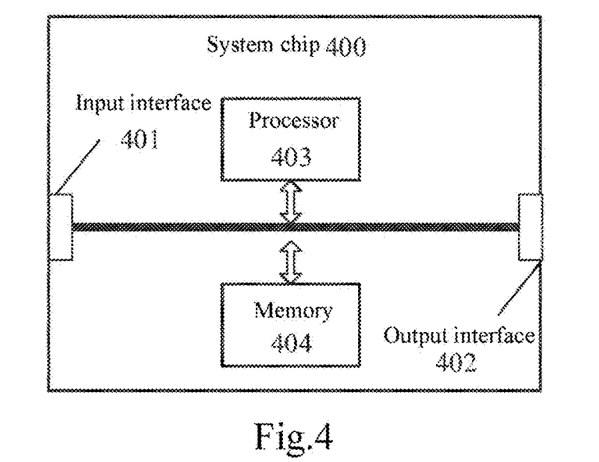
FIG. 4 is a schematic block diagram of a system chip according to an embodiment of the present application.

FIG. 4 is a schematic structural diagram of a system chip 400 according to an embodiment of the present application. The system chip 400 of FIG. 4 includes an input interface 401, an output interface 402, the processor 403, and a memory 404 that may be connected by internal communication connection lines, and the processor 403 is configured to execute codes in the memory 504.

When the codes are executed, the processor 403 implements the method performed by the terminal device in the method embodiment, which will not be repeated here for brevity.

Figure 5:
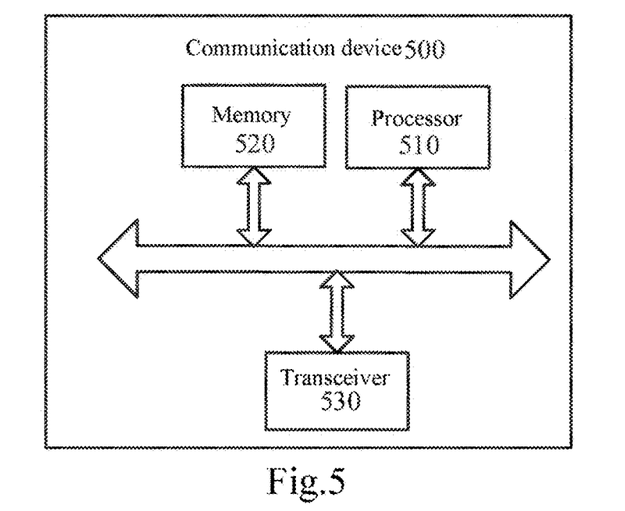
FIG. 5 is a schematic block diagram of a communication device according to an embodiment of the present application.

FIG. 5 is a schematic block diagram of a communication device 500 according to an embodiment of the present application. As shown in FIG. 5, the communication device 500 includes a processor 510 and a memory 520. The memory 520 may store program code, and the processor 510 may execute the program code stored in the memory 520.

Alternatively, as shown in FIG. 5, the communication device 500 may include a transceiver 530, and the processor may control the transceiver 530 to communicate externally.

The processor 510 may call the program code stored in the memory 520 to perform the corresponding operations of the terminal device in the method embodiment, which will not be repeated here for brevity.

It should be understood that the processor in the embodiments of the present disclosure may be an integrated circuit chip and has a signal processing capability. In an implementation process, the steps in the foregoing method embodiments may be completed using an integrated logic circuit of hardware in the processor or an instruction in a form of software. The above processor may be a general purpose processor, a Digital Signal Processor (DSP), an Application Specific Integrated Circuit (ASIC), a Field Programmable Gate Array (FPGA) or other programmable logic device, a discrete gate, or a transistor logic device, and a discrete hardware assembly, which may implement or execute the methods, steps, and logic diagrams disclosed in the embodiments of the present disclosure. The general purpose processor may be a microprocessor or the processor may be any conventional processor, or the like. The steps of the methods disclosed with reference to the embodiments of the present disclosure may be directly executed and accomplished by means of a hardware decoding processor or may be executed and accomplished using a combination of hardware and software modules in the decoding processor. The software module may be located in a mature storage medium in the art, such as a random access memory, a flash memory, a read-only memory, a programmable read-only memory, an electrically erasable programmable memory or a register. The storage medium is located in the memory. The processor reads information from the memory and completes the steps of the foregoing methods in combination with the hardware of the processor.

It may be understood that the memory in the embodiments of the present disclosure may be a volatile memory or a non-volatile memory, or may include both volatile and non-volatile memories. The non-volatile memory may be a Read-Only Memory (ROM), a Programmable Read-Only Memory (PROM), an Erasable PROM (EPROM), an Electrically EPROM (EEPROM), or a flash memory. The volatile memory may be a Random Access Memory (RAM) that acts as an external high speed cache. By way of illustration and not limitation, RAM in many forms is available such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memories of the systems and methods described herein are intended to include but not limited to these and any other suitable types of memories.

Those of ordinary skills in the art may be aware that, the units and algorithm steps of individual examples described in combination with the embodiments disclosed herein, may be implemented by electronic hardware or a combination of computer software and the electronic hardware. Whether the functions are performed by hardware or software depends on particular applications and design constraint conditions of the technical solutions. Those of ordinary skills in the art may use different methods to implement the described functions for each particular application, but it should not be considered that the implementation goes beyond the scope of the present application.

It may be clearly understood by those of ordinary skills in the art that, for the purpose of convenient and brief description, for a detailed working process of the foregoing systems, devices, and units, reference may be made to a corresponding process in the foregoing method embodiments, and details are not described herein again.

In the several embodiments provided in the present application, it should be understood that the disclosed systems, devices and methods may be implemented in other ways. For example, the device embodiments described above are merely illustrative. For example, the division of the units is only one kind of logical function division. In practice, there may be other division manner. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, they may be located in one place, or may be distributed on multiple network units. Some or all of the units may be selected according to actual needs to achieve the objectives of the solutions in the embodiments.

In addition, each functional unit in each embodiment of the present disclosure may be integrated in one processing unit, or each unit may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the related art or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk, or an optical disk.

The foregoing descriptions are merely detailed embodiments of the present disclosure, and the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be subjected to the protection scope of the claims.

What is claimed is:

1. A wireless communication method, comprising:
receiving an index of a SRS resource in a Sounding Reference Signal (SRS) resource set; wherein the SRS resource set is an SRS resource set for uplink beam management and comprises a plurality of SRS resources;
determining a same target path loss value for other SRS resources in the SRS resource set as the SRS resource indicated by the index;
determining a target transmission power for a SRS resource in the SRS resource set according to the target path loss value; and
transmitting an SRS to the network device on the SRS resource in the SRS resource set according to the target transmission power.

2. The method according to claim 1, wherein the determining the target transmission power for the SRS resource in the SRS resource set comprises:
determining a same target transmission power for the plurality of SRS resources in the SRS resource set.

3. The method according to claim 2, wherein the transmitting an SRS to the network device on the SRS resource in the SRS resource set according to the target transmission power comprises:
transmitting an SRS to the network device on the plurality of SRS resources in the SRS resource set according to the target transmission power.

4. A terminal device, comprising:
a processor;
a memory; and
a transceiver,
wherein the processor, the memory and the transceiver are communicated with each other through internal connection paths,
the transceiver is configured to receive an index of a SRS resource a Sounding Reference Signal (SRS) resource set; wherein the SRS resource set is an SRS resource set for uplink beam management and comprises a plurality of SRS resources;
the processor is configured to determine a same target path loss value for other SRS resources in the SRS resource set as the SRS resource indicated by the index; and determine a target transmission power for a SRS resource in the SRS resource set according to the target path loss value; and
the transceiver is further configured to transmit an SRS to the network device on the SRS resource in the SRS resource set according to the target transmission power.

5. The method according to claim 1, wherein before determining a same target path loss value for other SRS resources in the SRS resource set as the SRS resource indicated by the index, the method further comprises:
determining a first downlink signal for determining the same target path loss value for the plurality of SRS resources in the SRS resource set according to a first preset relationship.

6. The method according to claim 1, wherein the determining a same target path loss value for other SRS resources in the SRS resource set as the SRS resource indicated by the index comprises:
determining a path loss value used for calculating a transmission power of a first uplink signal as the same target path loss value.

7. The method according to claim 5, wherein the first downlink signal comprises one of following: a CSI-RS, a synchronization signal, a synchronization signal block, a time-frequency Tracking Reference Signal (TRS), a Phase Tracking Reference Signal (PTRS), a Physical Downlink Shared Channel (PDSCH), a Physical Downlink Control Channel (PDCCH), and a DMRS.

8. The method according to claim 3, wherein the transmitting an SRS to the network device on the plurality of SRS resources in the SRS resource set according to the target transmission power comprises:
transmitting the SRS to the network device using different transmission beams on different SRS resources in the SRS resource set respectively according to the target transmission power.

9. The terminal device according to claim 4, wherein the processor is further configured to determine a same target transmission power for the plurality of SRS resources in the SRS resource set.

10. The terminal device according to claim 9, wherein the transceiver is further configured to transmit an SRS to the network device on the plurality of SRS resources in the SRS resource set according to the target transmission power.

11. The terminal device according to claim 4, wherein the processor is further configured to determine a first downlink signal for determining the same target path loss value for the plurality of SRS resources in the SRS resource set according to a first preset relationship.

12. The terminal device according to claim 11, wherein the first downlink signal comprises one of following: a CSI-RS, a synchronization signal, a synchronization signal block, a time-frequency Tracking Reference Signal (TRS), a Phase Tracking Reference Signal (PTRS), a Physical Downlink Shared Channel (PDSCH), a Physical Downlink Control Channel (PDCCH), and a DMRS.

13. The terminal device according to claim 4, wherein the processor is further configured to determine a path loss value used for calculating a transmission power of a first uplink signal as the same target path loss value.

14. A wireless communication method, comprising:
configuring, by a network device, a plurality of Sounding Reference Signal (SRS) resources in a SRS resource set for a terminal device; wherein the SRS resource set is an SRS resource set for uplink beam management;
indicating, by the network device, an index of a SRS resource in the SRS resource set, wherein other SRS resources in the SRS resource set adopts a same target path loss value as the SRS resource indicated by the index; and
receiving, by the network device, an SRS on the SRS resource in the SRS resource set according to a target transmission power determined for the SRS resource in the SRS resource set according to the same target path loss value.

15. The method according to claim 14, wherein the receiving, by the network device, an SRS on the SRS resource in the SRS resource set according to a target transmission power determined for the SRS resource in the SRS resource set according to the same target path loss value comprises:
receiving, by the network device, an SRS on the plurality of SRS resources in the SRS resource set according to the target transmission power determined for the SRS resource in the SRS resource set according to the same target path loss value.

16. The method according to claim 15, wherein the method further comprises: indicating, by the network device, a first downlink signal to the terminal device for determining the same target path loss value for the plurality of SRS resources in the SRS resource set; and wherein the first downlink signal comprises one of following: a CSI-RS, a synchronization signal, a synchronization signal block, a time-frequency Tracking Reference Signal (TRS), a Phase Tracking Reference Signal (PTRS), a Physical Downlink Shared Channel (PDSCH), a Physical Downlink Control Channel (PDCCH), and a DMRS.

17. A network device, comprising:
a processor;
a memory; and
a transceiver,
wherein the processor, the memory and the transceiver are communicated with each other through internal connection paths,
the processor is configured to configure a plurality of Sounding Reference Signal (SRS) resources in a SRS resource set for a terminal device; wherein the SRS resource set is an SRS resource set for uplink beam management; and indicate an index of a SRS resource in the SRS resource set, wherein other SRS resources in the SRS resource set adopts a same target path loss value as the SRS resource indicated by the index; and
the transceiver is configured to receive an SRS on the SRS resource in the SRS resource set according to a target transmission power determined for the SRS resource in the SRS resource set according to the same target path loss value.

18. The network device according to claim 17, wherein the transceiver is further configured to receive an SRS on the plurality of SRS resources in the SRS resource set according to the target transmission power determined for the SRS resource in the SRS resource set according to the same target path loss value.

19. The network device according to claim 18, wherein the processor is further configured to indicate a first downlink signal to the terminal device for determining the same target path loss value for the plurality of SRS resources in the SRS resource set; and
wherein the first downlink signal comprises one of following: a CSI-RS, a synchronization signal, a synchronization signal block, a time-frequency Tracking Reference Signal (TRS), a Phase Tracking Reference Signal (PTRS), a Physical Downlink Shared Channel (PDSCH), a Physical Downlink Control Channel (PDCCH), and a DMRS.

* * * * *